(12) United States Patent
Brogle et al.

(10) Patent No.: US 12,052,049 B2
(45) Date of Patent: Jul. 30, 2024

(54) TR SWITCH WITH HIGH RX POWER PROTECTION

(71) Applicant: MACOM Technology Solutions Holdings, Inc., Lowell, MA (US)

(72) Inventors: James Brogle, Lowell, MA (US); Jean-Marc Mourant, Lowell, MA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 136 days.

(21) Appl. No.: 17/370,013

(22) Filed: Jul. 8, 2021

(65) Prior Publication Data
US 2023/0008159 A1    Jan. 12, 2023

(51) Int. Cl.
*H04B 1/48*    (2006.01)
*H01Q 1/50*    (2006.01)

(52) U.S. Cl.
CPC ............ *H04B 1/48* (2013.01); *H01Q 1/50* (2013.01)

(58) Field of Classification Search
CPC ...................................................... H04B 1/48
See application file for complete search history.

(56) References Cited

U.S. PATENT DOCUMENTS

| | | | |
|---|---|---|---|
| 5,300,900 A * | 4/1994 | Bellantoni | H03G 11/025 327/309 |
| 8,472,887 B2 | 6/2013 | Penn et al. | |
| 8,886,136 B1 | 11/2014 | Signoff et al. | |
| 9,031,518 B2 | 5/2015 | Lin | |
| 9,239,371 B1 * | 1/2016 | Bradley | H03G 11/02 |
| 9,246,535 B2 | 1/2016 | Jerng et al. | |
| 9,300,352 B2 | 3/2016 | Brinkhoff et al. | |
| 9,961,631 B2 | 5/2018 | McIntyre | |
| 10,135,407 B1 | 11/2018 | Chin et al. | |
| 2003/0035259 A1 * | 2/2003 | Mauder | H01L 27/0255 361/93.1 |
| 2003/0156060 A1 * | 8/2003 | Revankar | G01S 7/032 342/372 |

* cited by examiner

*Primary Examiner* — Hsinchun Liao
(74) *Attorney, Agent, or Firm* — Jason H. Vick; Sheridan Ross. PC (57) ABSTRACT

A transmit-received (TR) switch is designed such that the receiver-side shunt PIN diode acts as a switchable shunt diode while the switch operates in transmit mode and acts as a limiter while the switch operates in receive mode. This is achieved using a DC Schottky diode between the receiver-side shunt network and the biasing network. While the switch operates in receive mode, received radio frequency (RF) signals that exceed a power threshold cause the Schottky diode to become forward biased, causing the shunt PIN diode to act as a limiter that protects the receiver from excessively high RF signal power. This approach affords a high level of protection using a small number of components and without adding insertion loss to the RF signal path.

20 Claims, 7 Drawing Sheets

TR SWITCH WITH HIGH RX POWER PROTECTION

TECHNICAL FIELD

The subject disclosure relates generally to electrical circuits and, in particular, to transmit-receive switches.

BACKGROUND

Figure 1A:
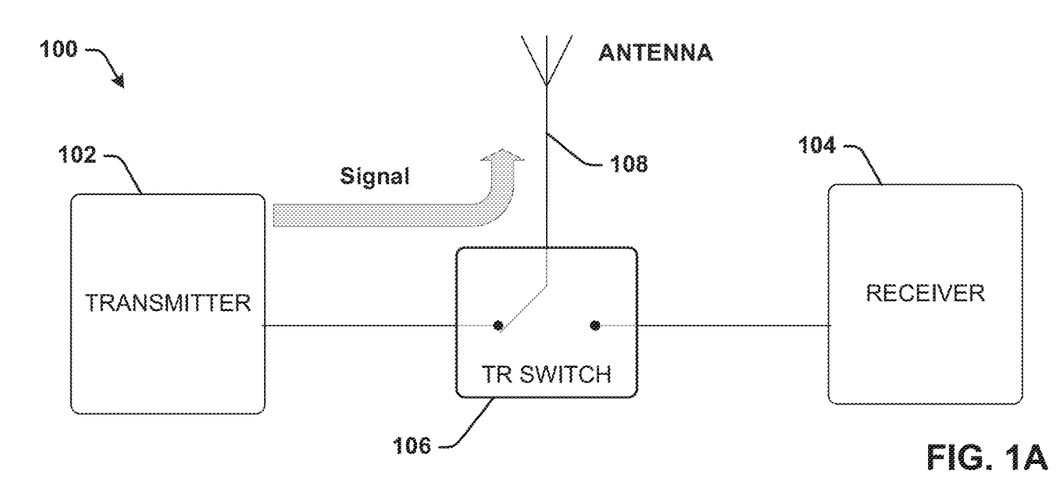
FIG. 1A is a high-level block diagram of an example communication system that employs a TR switch, with the TR switch operating in transmit mode.
Figure 1B:
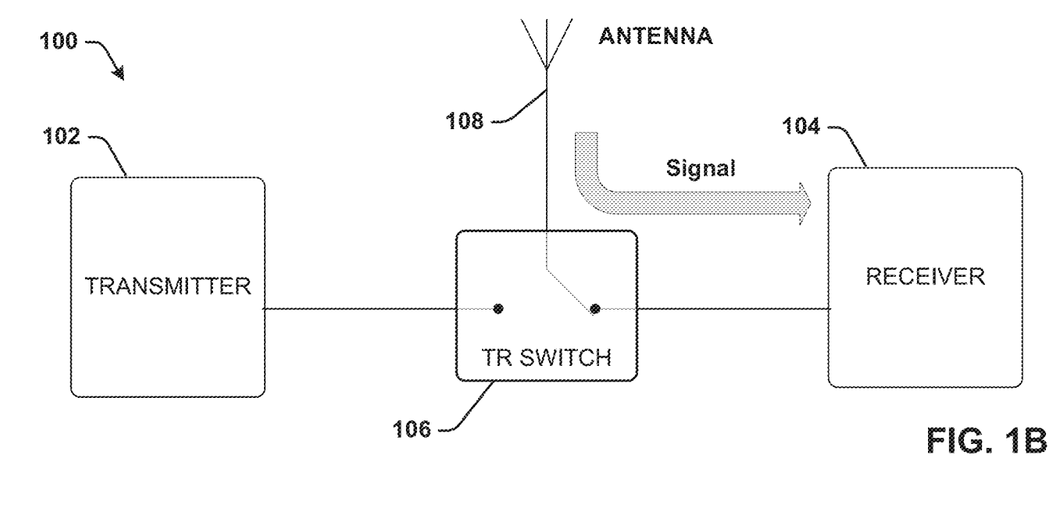
FIG. 1B is a high-level block diagram of an example communication system that employs a TR switch, with the TR switch operating in receive mode.

Communication systems in which a common antenna is used to both transmit and receive radio frequency (RF) signals often include transmit-receive (TR) switches, which switch the antenna between the transmitter circuitry and the receiver circuitry depending on whether the system is operating in transmit mode or receive mode. FIGS. 1A and 1B are high-level block diagrams of an example communication system 100 that employs a TR switch 106. Communication system 100 includes a transmitter branch 102 that generates signals to be transmitted via an antenna 108 during a transmit mode (depicted in FIG. 1A), and a receiver branch 104 that receives and processes signals received at the antenna during a receive mode (depicted in FIG. 1B). TR switch 106 selectively switches the antenna's signal path between the transmitter branch 102 and the receiver branch 104 in accordance with the current operating mode (transmit or receive mode) of the communication system 100.

During receive mode, signals received by the antenna 108 are typically low power and therefore pose a low risk of damaging the low noise amplifier (LNA) of the receiver circuitry. However, in some scenarios the received signal may be strong enough to risk damaging the LNA. For example, a nearby radar or jammer device may generate large signals for the purposes of electronic warfare. Time Division Duplexing (TDD) base stations can also experience large receive signals during a malfunction. A forgotten cell phone brought near the base station antenna during servicing or a break of synchronization can cause transmitters to operate at the wrong time, putting the receiver circuitry at risk. TR switches must be designed to adequately protect the receiver branch's LNA during such scenarios in which an unexpectedly high power signal is received.

The above-described description is merely intended to provide a contextual overview of TR switches and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In one or more embodiments, a transmit-receive (TR) switch circuit is provided, comprising a transmitter-side series PIN diode that permits first radio frequency (RF) signals generated by a transmitter to pass to an antenna while the TR switch circuit operates in a transmit mode; a receiver-side series PIN diode that permits second RF signals received at the antenna to pass to a receiver while the TR switch circuit operates in a receive mode; a receiver-side shunt PIN diode that connects a signal path of the second RF signal to ground via a direct current (DC) blocking capacitor; and circuitry that causes the receiver-side shunt PIN diode to operate as a switchable shunt diode while the TR switch circuit operates in the transmit mode, and to operate as a limiter while the TR switch circuit operates in the receive mode.

Also, according to one or more embodiments, a transmit-receive (TR) switch circuit is provided, comprising transmitter-side circuitry that switches an antenna to a transmitter while the TR switch circuit operates in a transmit mode; receiver-side circuitry that switches the antenna to a receiver while the TR switch operates in a receive mode, wherein the receiver-side circuitry comprises a shunt PIN diode and protective circuitry configured to cause the shunt PIN diode to operate as a switchable shunt diode while the TR switch circuit operates in the transmit mode and to operate as a limiter while the TR switch circuit operates in the receive mode.

Also, according to one or more embodiments, a method for protecting a receiver from high powered signals is provided, comprising, in response to determining that a transmit-receive (TR) switch is operating in a transmit mode, causing a shunt PIN diode that is part of receiver-side protective circuitry to operate as a switchable shunt diode; and in response to determining that the TR switch is operating in a receive mode, causing the shunt PIN diode to operate as a limiter.

DETAILED DESCRIPTION

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Figure 2:
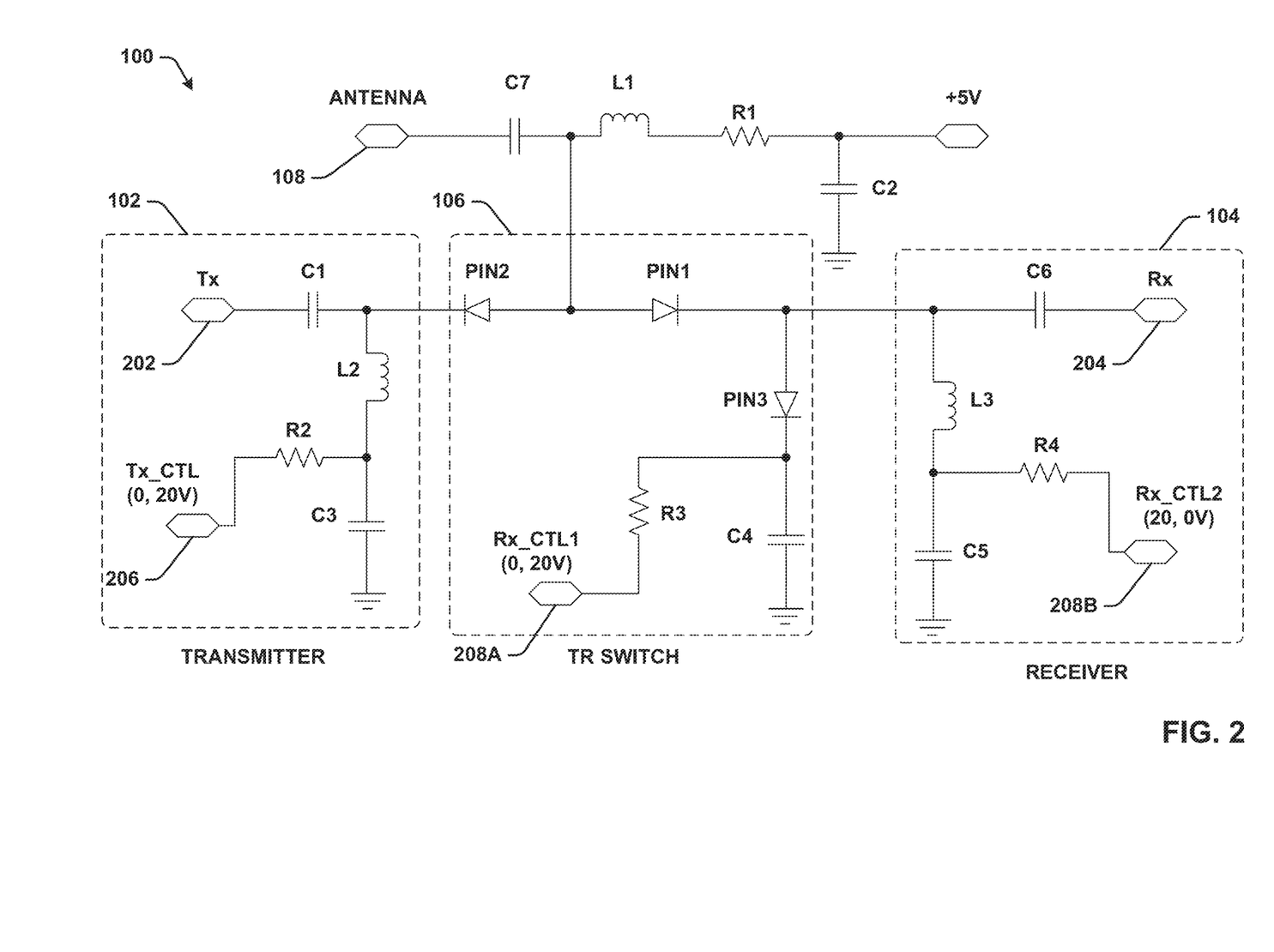
FIG. 2 is a circuit diagram of an example communication system that includes a TR switch.

FIG. 2 is a circuit diagram of an example communication system 100 that includes a TR switch 106. In this example, an antenna 108 is shared by a transmitter branch 102 and a receiver branch 104. The transmitter branch 102 includes a transmitter 202 that generates RF signals to be conveyed to and transmitted by the antenna 108 while the system operates in transmit mode. The receiver branch 104 includes a receiver 204 that processes RF signals received at the antenna 108 while the system operates in receive mode (details of the transmitter 202 and receiver 204 are omitted for clarity).

TR switch 106 includes three PIN diodes—PIN1, PIN2, and PIN3—that selectively switch the antenna 108 between the transmitter branch 102 and the receiver branch 104 in accordance with the current operating mode of the communication system. PIN1 is a receiver-side series diode connected in series with the RF signal path between the antenna 108 and the receiver 204 (the receive signal path), such that the anode of PIN1 is connected to the antenna 108 via a capacitor C7, and the cathode of PIN1 is connected to the receiver 204 via a capacitor C6. PIN2 is a transmitter-side series diode connected in series with the RF signal path between the antenna 108 and the transmitter 202 (the transmit signal path), such that the anode of PIN2 is connected to antenna 108 via capacitor C7 and the cathode of PIN2 is connected to the transmitter via a capacitor C1. The circuit diagram illustrated in FIG. 2 is only intended to be an exemplary, simplified diagram, and it is to be appreciated that the RF signal paths to and from the antenna 108 may include additional components not depicted in FIG. 2. Moreover, although the example TR switches depicted herein use a receiver-side series diode PIN1 and a transmitter-side series diode PIN2 to perform the switching and isolation for the receiver branch 104 and the transmitter branch 102, respectively, the embodiments described herein are not limited to use with such TR switch designs. For example, the receiver-side and transmitter-side series diodes PIN1 and PIN2 could be replaced with transmission lines, field-effect transistors (FETs), resonators, inductors, passive circuits, or other means for selectively isolating the respective branches.

PIN3 is a shunt diode that connects the receive signal path to ground via a DC blocking capacitor C4. The anode of the shunt diode PIN3 is connected to the receive signal path at a node between the receiver-side series diode PIN1 and the receiver 204, and the cathode of the shunt diode PIN3 is connected to ground via a capacitor C4. In this configuration, the shunt diode PIN3 serves to shunt RF signals that may pass through the receiver-side series diode PIN1 during transmit mode to ground, thereby improving isolation of the receiver 204 during transmit mode.

Switching of the RF signal path between the transmitter branch 102 and the receiver branch 104 is performed by selectively biasing the PIN diodes using a DC transmit control signal Tx_CTL generated by a transmit control signal generator 206 and two DC receive control signals Rx_CTL1 and Rx_CTL2 generated by respective two receive control signal generators 208A and 208B. The transmit control signal generator 206 is connected to the cathode of the transmitter-side series diode PIN2 via a resistor R2 and an RF choke inductor L2, which serves to prevent leakage of the transmit RF signal into the path of the transmitter control signal Tx_CTL while still permitting the DC control signal to pass. The node between resistor R2 and choke inductor L2 is connected to ground through a DC blocking capacitor C3, which serves to shunt any RF signal that passes through the choke inductor L2 to ground. Resistor R2, choke inductor L2, and DC blocking capacitor C3 make up a biasing network that connects the transmit control signal Tx_CTL to the transmit-side RF signal path. A similar biasing network comprising resistor R4, choke inductor L3, and DC blocking capacitor C5 connects the receive control signal generator 208B to the receive-side RF signal path. Receive control signal generator 208A is connected to the cathode of the shunt diode PIN3 via a resistor R3.

To switch the signal path from the antenna 108 to the transmitter 202 during transmit mode, transmit control signal Tx_CTL and receive control signal Rx_CTL1 can be set to 0 volts (V), while receive control signal Rx_CTL2 can be set to 20V. This forward biases the transmit-side series diode PIN2, allowing the RF signal from the transmitter 202 to pass through this diode PIN2 to the antenna 108 due to the low impedance state of the diode PIN2. At the same time, the receiver-side series diode PIN1 is reverse biased and the shunt diode PIN3 is forward biased. The high impedance of the reverse-biased series diode PIN1 prevents most or all of the RF signal from passing to the receiver 204. Since the shunt diode PIN3 is forward biased while in transmit mode, any RF signal that passes through the receiver-side diode PIN1 is shorted to ground via the shunt diode PIN3 and capacitor C4, further isolating the receiver 204 from the RF signal during transmit mode.

To switch the signal path from the antenna 108 to the receiver during receive mode, the control signals are toggled such that transmit control signal Tx_CTL and receive control signal Rx_CTL1 are set to 20V and receive control signal Rx_CTL2 is set to 0V. This control signaling causes the transmit-side series diode PIN2 to be reverse biased, thereby switching the diode PIN2 to its high impedance state and preventing the received RF signal from being passed to the transmitter. At the same time, the receive-side series diode PIN1 is forward biased and the shunt diode PIN3 is reverse biased. The resulting low impedance state of receive-side series diode PIN1 allows the received RF signal from the antenna 108 to be passed to the receiver 204, while the high impedance state of the shunt diode PIN3 prevents the RF signal from being shorted to ground.

Figure 3:
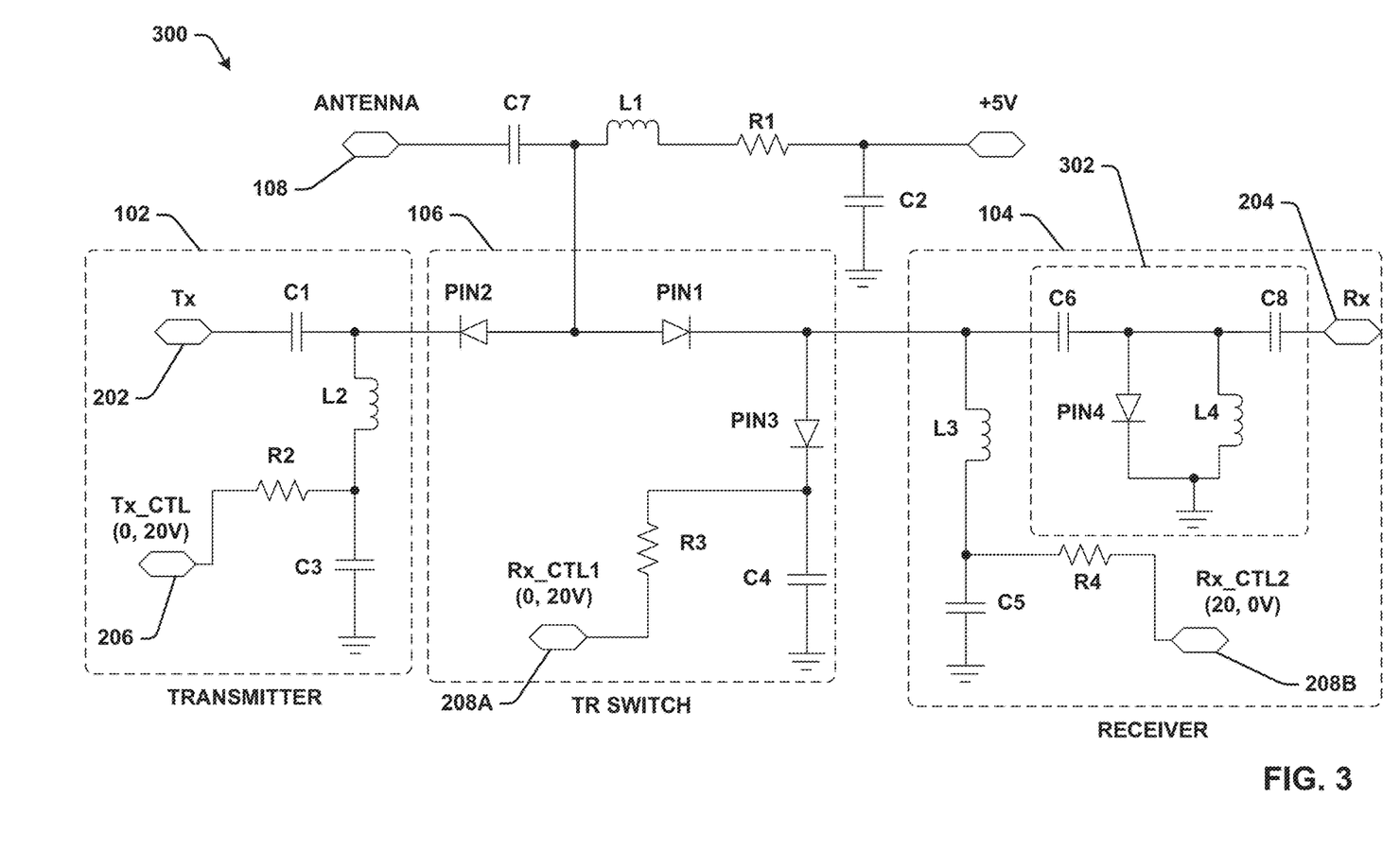
FIG. 3 is a circuit diagram of an example communication system in which a limiter circuit has been added between the TR switch and the receiver to improve protection of the receiver's LNA.

As noted above, abnormally high-powered RF signals received during receive mode can potentially damage the receiver's LNA. The design depicted in FIG. 2 offers poor receiver protection since the shunt diode PIN3 is reverse biased with 20V, resulting in high compression while in receive mode (approximately 100 watts). Typical gallium arsenide (GaAs) LNAs can only withstand 20 to 25 decibel-milliwatts (dBm), limited by the input transistor breakdown. To protect against higher powered signals (e.g., signals in the range of 1 to 5 watts), a limiter circuit can be added. FIG. 3 is a circuit diagram of an example communication system 300 in which a limiter circuit 302 has been added between the TR switch 106 and the receiver 204 to improve protection of the receiver's LNA. Limiter circuit 302 comprises a limiting diode PIN4 (e.g., a PIN diode) and an RF choke inductor L4, which are connected in parallel between the input of the receiver 204 and ground. In this example, limiter circuit 302 also includes a DC blocking capacitor C8 connected in series with the receiver-side RF signal path, between receiver 204 and the other limiter circuit components PIN4 and L4. Capacitors C8 and C6 serve as a DC blocking capacitors which prevent DC signals from biasing the limiting diode PIN4.

While low power RF signals are present on the RF signal path from the antenna 108 to the receiver 204, or while no signal is present, the impedance of the limiting diode PIN4 remains high and consequently insertion loss remains low. When the power of the received RF signal exceeds a threshold level (determined based on the design of the limiting diode PIN4), the impedance of the limiting diode PIN4 increases, resulting in an impedance mismatch at the input of the limiter circuit 302 that causes a portion of the RF signal power to be reflected back toward its source. This causes the power level of the RF signal passed to the receiver 204 to be less than the power level of the RF signal received at the limiter circuit 302. In this way, limiter circuit 302 limits the amount of RF signal power passed to the receiver 204. While the impedance of the limiting diode PIN4 is reduced due to an RF signal having a power level that exceeds the threshold, current passes through the limiter diode PIN4 and flows through the loop formed by the limiter diode PIN4 and the choke inductor L4.

Although limiter circuits 302 effectively limit the amount of RF signal power seen by the receiver, addition of the RF components that make up the limiter circuit 302 also increase the insertion loss of the receiver-side RF signal path, and thus degrade performance. Addition of a limiter circuit 302 also adds to the size of the system 300. As an alternative to limiter circuits 302, the LNA can be designed using a more robust technology with a higher tolerance, such as gallium nitride (GaN). However, these technologies are expensive and add considerably to manufacturing costs.

Figure 4:
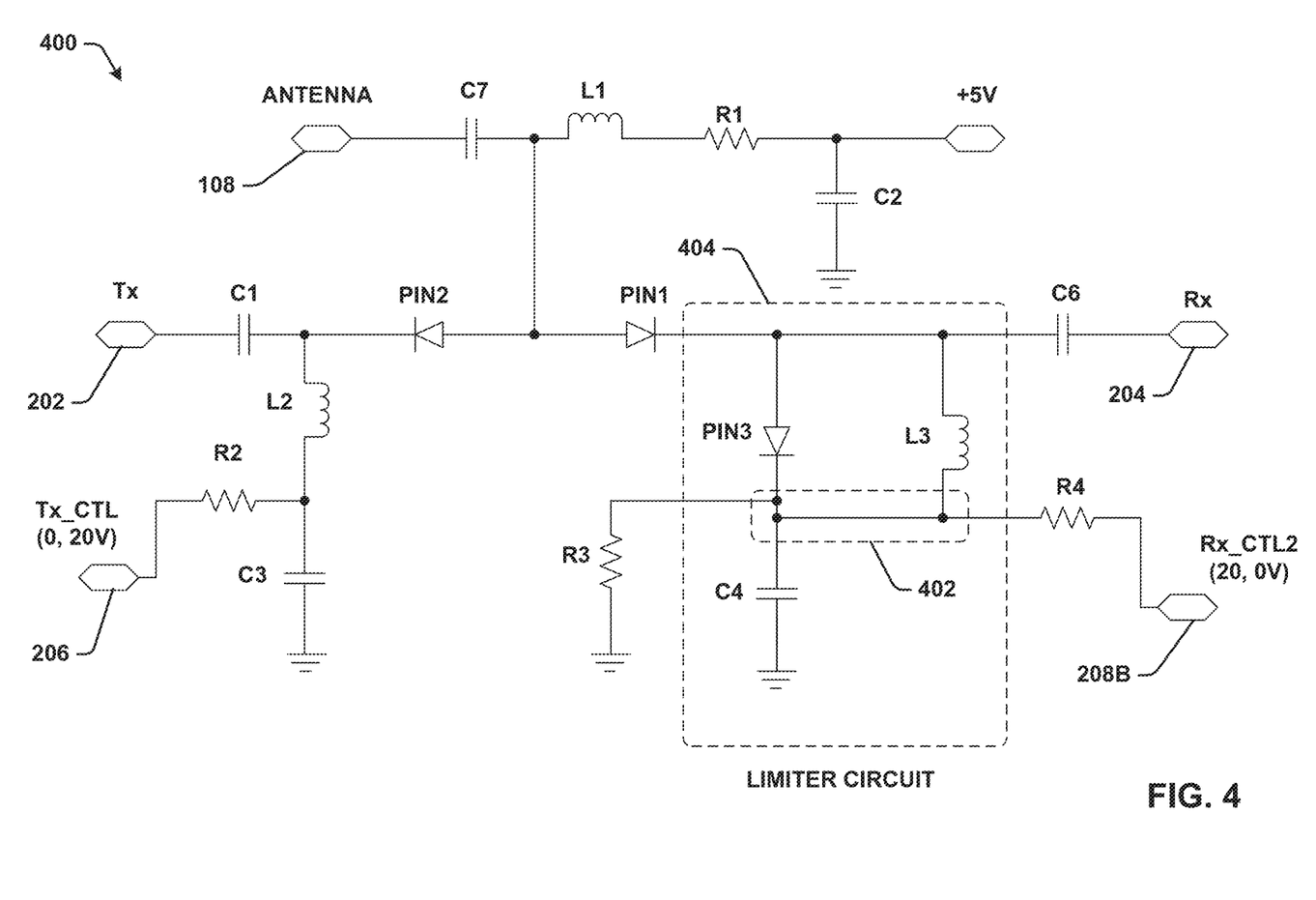
FIG. 4 is a circuit diagram of an example communication system in which the shunt branch of the TR switch is replaced by a limiter circuit by adding a short.

FIG. 4 is a circuit diagram of another communication system 400 that implements another approach to protecting the receiver's LNA. In this example, the shunt branch of the TR switch 106 is replaced by a limiter circuit 404 by adding a short 402 between the cathode of the shunt diode PIN3 and the node that connects choke inductor L3 to resistor R4. This yields a limiter circuit 404 that functions comparably to limiter circuit 302 described above in connection with FIG. 3. This approach saves cost and space since no new RF components are added. However, in this configuration diode PIN3 no longer functions to shunt RF signals on the receiver-side RF signal path, and consequently does not help to isolate the receiver 204 during transmit mode. Ideally, the shunt branch should be maintained to provide high isolation even when no transmit power is applied.

Figure 5:
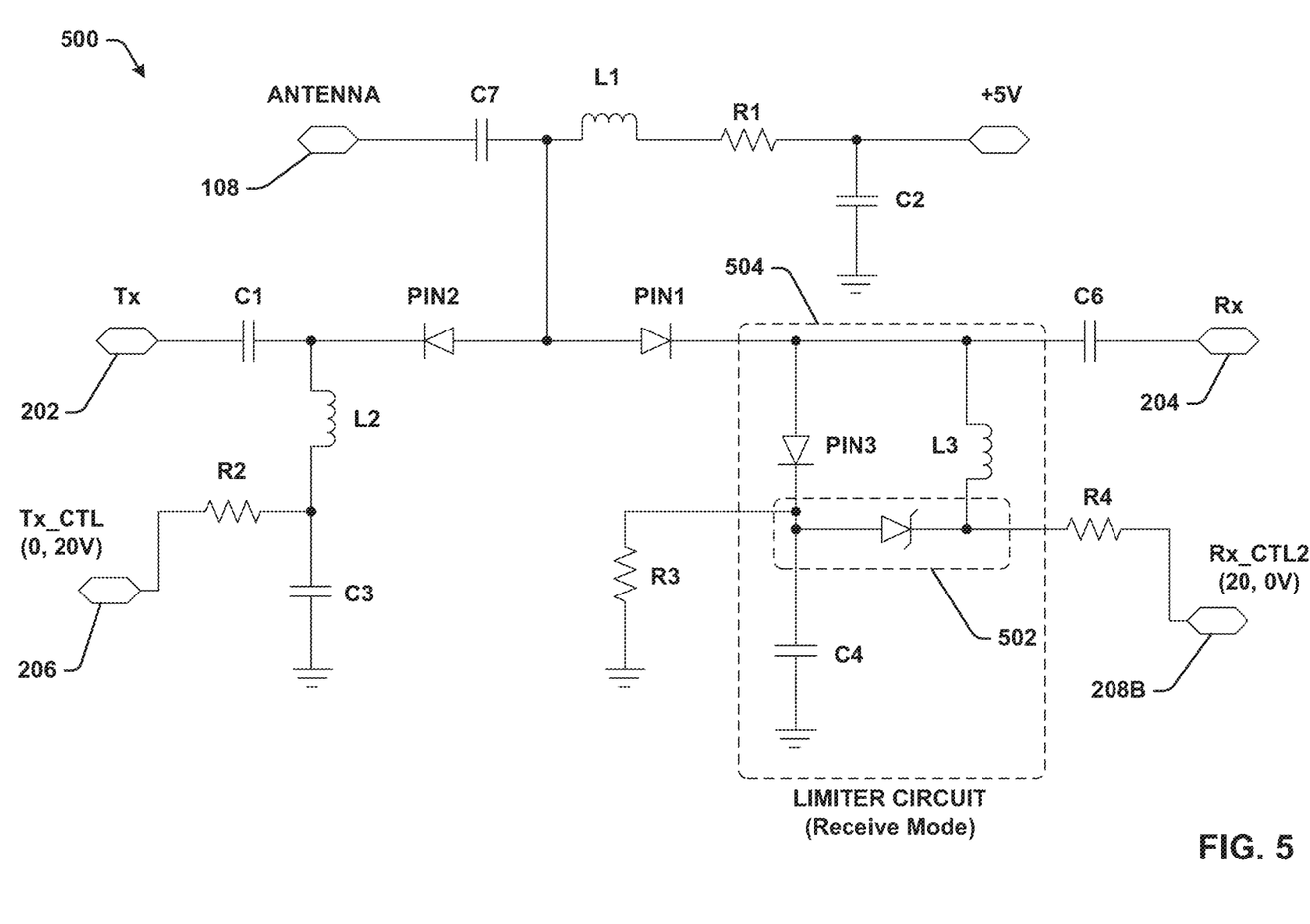
FIG. 5 is a circuit diagram of an example communication system in which the receiver-side shunting and biasing network is configured to cause the shunt diode to act as a switchable shunt diode while the system operates in transmit mode and to act as a limiter while the system operates in receive mode.

To address these and other issues, one or more embodiments described herein provide a TR switch design in which the receiver-side shunt diode PIN3 acts both as a switchable diode and as a limiter. FIG. 5 is a circuit diagram of an example communication system 500 in which the receiver-side shunting and biasing network is configured to cause the shunt diode PIN3 to act as a switchable shunt diode while the system 500 operates in transmit mode and to act as a limiter while the system 500 operates in receive mode. This design modifies the general architecture of communication system 100 depicted in FIG. 2 by adding a DC Schottky diode 502 between the receiver-side shunt network and the biasing network of receive control signal RX_CTL2. Specifically, the anode of the Schottky diode 502 is connected to the cathode of shunt diode PIN3, and the cathode of Schottky diode 502 is connected to the node between the RF choke inductor L3 and resistor R4 of the RX_CTL2 biasing network. This configuration also omits the receive control signal generator 208A, which reverse biased the shunt diode PIN3 with 20V during receive mode in the example depicted in FIG. 2. Instead the cathode of the shunt diode PIN3 is connected to ground via resistor R3.

Addition of the Schottky diode 502 causes the receiver-side circuit to be biased differently relative to the design depicted in FIG. 2. While the system 500 operates in transmit mode, the receive control signal Rx_CTL2 is set to 20V, which reverse biases the Schottky diode 502 and forward biases the shunt diode PIN3. The Schottky diode 502 therefore remains off (i.e., remains in its high impedance state) and the shunt diode PIN3 is permitted to conduct RF signals to ground via capacitor C4, in a manner similar to system 100 depicted in FIG. 2. Any DC component on the receiver side RF signal path while in transmit mode is shunted to ground via the shunt diode PIN3 and resistor R3, which is connected to ground rather than receive control signal generator 208A in this configuration.

While system 500 operates in receive mode, the receive control signal Rx_CTL2 is set to 0V, causing the shunt diode PIN3 to remain off while RF signals below the power threshold are being passed to the receiver 204. If the power of the received RF signal increases to a level sufficiently high to forward bias the shunt diode PIN3, current begins to flow through the shunt diode PIN3 after a delay proportional to the thickness of the diode's I-region. Since the Schottky diode 502 begins conducting at a lower forward voltage (e.g., 200-250 mV) than the shunt diode PIN3, which may have a forward voltage of approximately 700 mV in some cases, the Schottky diode 502 will become forward biased before the shunt diode PIN3. This ensures that, when the RF signal power becomes sufficiently high to turn on the shunt diode PIN3, the current that flows through the shunt diode PIN3 will flow through the Schottky diode 502 (which is already forward biased before the shunt diode PIN3) and the RF choke inductor L3. Thus, the shunt diode PIN3, the Schottky diode 502, the RF choke inductor L3 of the receive-side biasing network, and DC blocking capacitor C4 act as a limiter circuit 504 while the system 500 operates in receive mode. This limiter circuit 504 serves to protect the LMA of the receiver 204 in a manner similar to the limiter circuit 302 described above in connection with FIG. 3, creating an impedance mismatch while the shunt diode PIN3 is on which causes a portion of the RF signal power to be reflected back toward its source. This limits the amount of RF signal power that passes through to the receiver 204.

In contrast to adding a separate limiter circuit 302 before the receiver 204 as illustrated in FIG. 3, which requires addition of another inductor L4 and capacitor C8 to the system, the design approach depicted in FIG. 5 adds no new RF components to protect the LNA, but rather only adds a DC Schottky diode 502. Consequently, the approach depicted in FIG. 5 does not increase insertion loss as does the addition of a dedicated limiter circuit 302. Moreover, since the limiter circuit 504 is designed to operate as a shunt branch while the system 500 operates in transmit mode, the design provides high isolation of the receiver 204 even if no power is applied to the receiver-side RF signal path (in contrast to the design depicted in FIG. 4). The Schottky diode 502 operates at DC, enabling DC current in the shunt diode PIN3, and so does not add RF loss and can be placed far from the RF signal.

In some embodiments, a special limiting diode with a short carrier lifetime can also be added to ensure that the shunt diode PIN3 switches fast enough to protect the LNA. To minimize power dissipation, such a limiting diode can be selected to be physically smaller than the shunt diode PIN3 for the same capacitance, since the limiting diode's I-region is thinner than that of the shunt diode.

Figure 6:
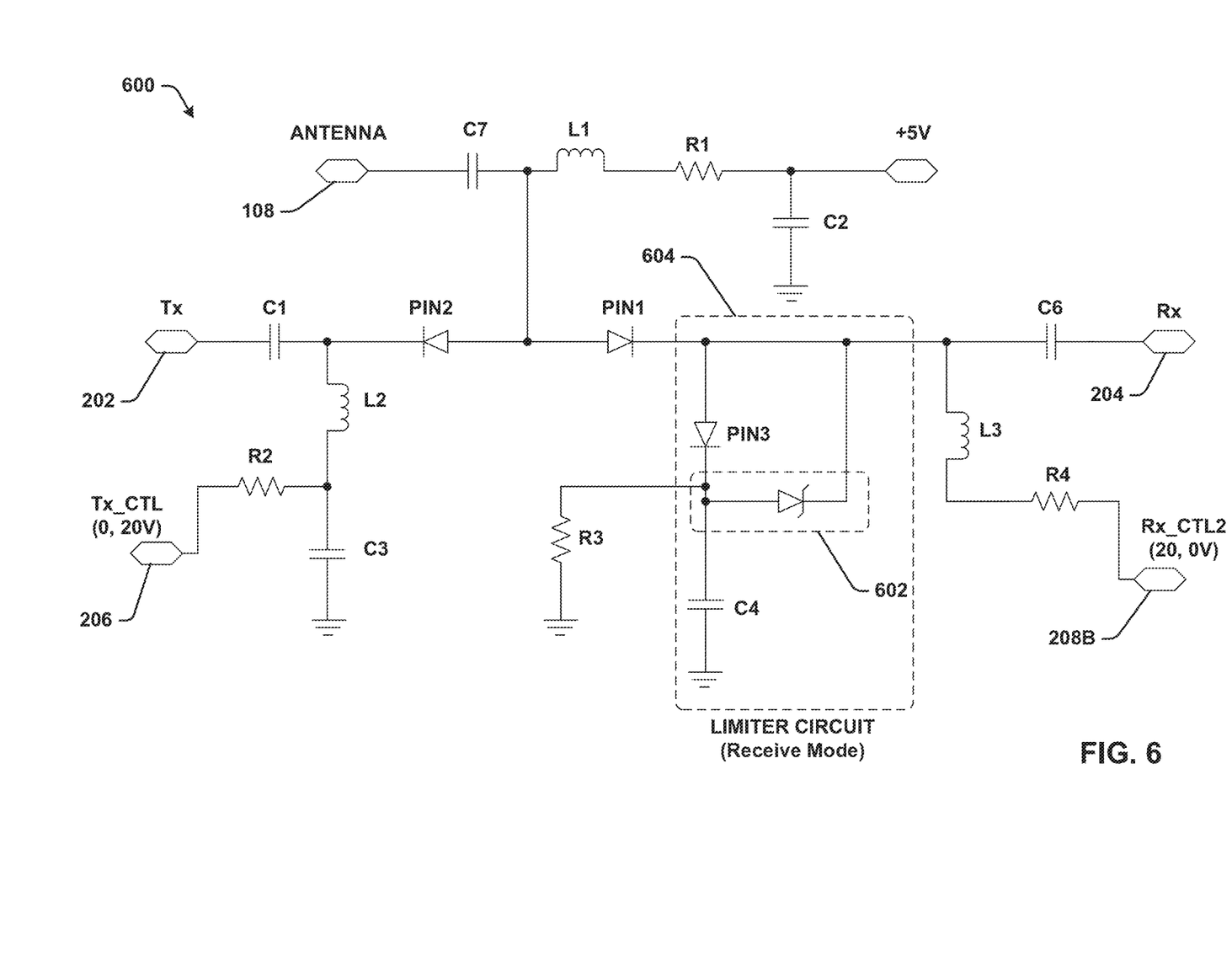
FIG. 6 is a circuit diagram of an example communication system in which a Schottky diode causes a receiver-side shunt diode to act as a limiter while the system operates in receive mode.

FIG. 6 is a circuit diagram of another example communication system 600 according to one or more embodiments. In this example, the general architecture of communication system 100 illustrated in FIG. 2 is modified by adding a Schottky diode 602 in parallel with the shunt diode PIN3, such that the anode of the Schottky diode 602 is connected to the cathode of the shunt diode PIN3 and the cathode of the Schottky diode 602 is connected to the receiver-side RF signal path between the receiver-side series diode PIN1 and capacitor C6. In this configuration, received RF signals above a threshold power will forward bias the Schottky diode 602 which, in turn, forward biases the shunt diode PIN3. Thus, while in receive mode, the shunt diode PIN3, the Schottky diode 602, and the DC blocking capacitor C4 operate as a limiter circuit 604. Similar to the configuration illustrated in FIG. 5, the shunt diode PIN3 acts as a switchable shunt while the system 600 is in transmit mode. Although the configuration depicted in FIG. 6 adds a small amount of RF loss relative to the configuration depicted in FIG. 5 due to the connection of the Schottky diode 602 to the RF signal path, this configuration can improve the level of protection since a large and thick PIN diode can be used as the shunt diode PIN3.

Although FIGS. 5 and 6 depict the limiter circuits 504 and 604 as part of a TR switch that uses PIN diodes (PIN1 and PIN2) to selectively isolate the receiver and transmitter branches, the limiter circuits 504 and 604 can be integrated into other types of TR switches without departing from the scope of this disclosure. For example, limiter circuits 504 and 604 can be included in TR switches that use other electrical components to selectively isolate the receiver and transmitter branches, including but not limited FETs, transmission lines, resonators, inductors, passive circuits, or other such components.

Embodiments described herein improve protection of receiver components, such as the LNA, from excessive RF signal power using a design that adds fewer components than other protective circuit designs and that does not degrade RF performance with additional insertion loss.

Figure 7:
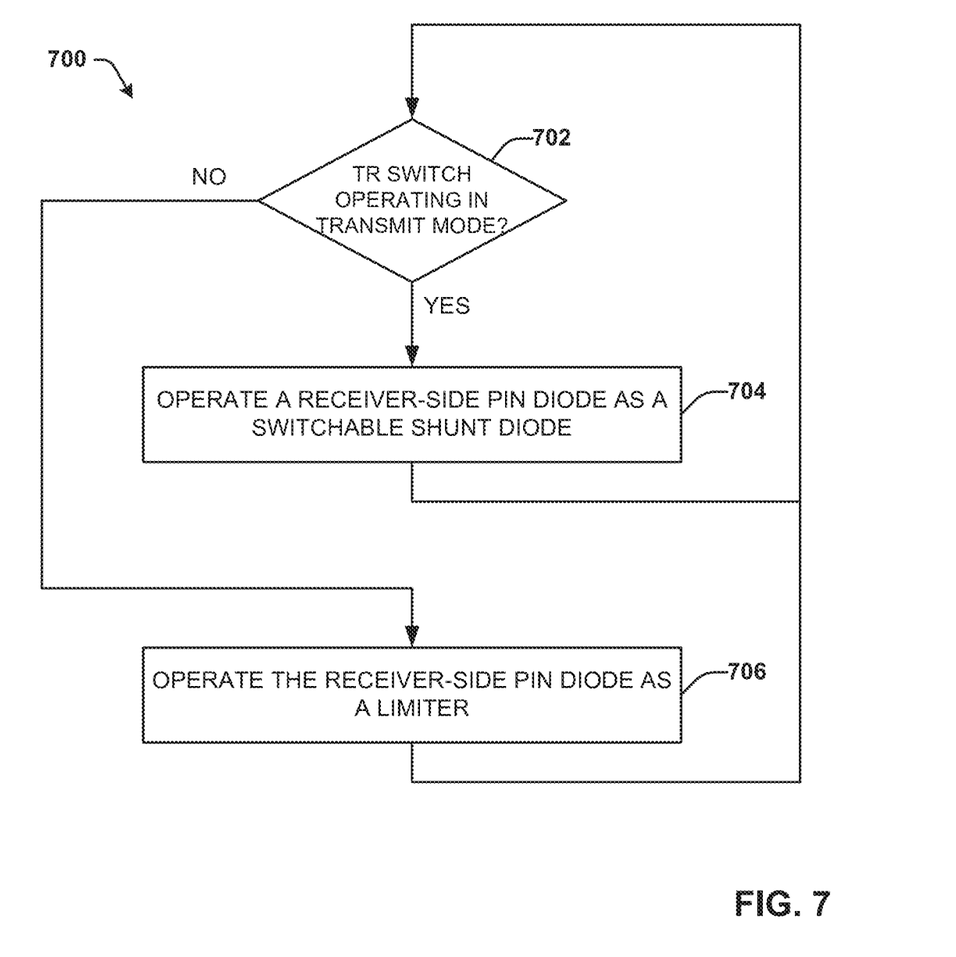
FIG. 7 illustrates a flow diagram of an example, non-limiting embodiment of a method for operating a TR switch.

FIG. 7 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Referring to FIG. 7, a flow diagram of an example, non-limiting embodiment for operating a TR switch is shown. The TR switch can be part of a communication system in which transmit circuitry and receiver circuitry share a common antenna, such that the TR switch controls switching of the receiver circuitry and the transmit circuitry to the antenna. The TR switch can comprise at least a transmitter-side series PIN diode that is turned on while the communication system operates in transmit mode to allow RF signals from the transmit circuitry to pass to the antenna, a receiver-side series PIN diode that is turned on while the communication system operates in receive mode to allow RF signals from the antenna to pass to the receiver circuitry, and a receiver-side shunt PIN diode that serves to isolate and protect the receiver circuitry from excessively high-powered RF signals. Method 700 can begin at step 702, where a determination is made as to whether the TR switch is operating in transmit mode. In some embodiments, the operating mode of the TR switch can be set using separate transmit and receive control signals that control the biasing of the transmitter-side and receiver-side series diodes and the shunt diode. If the TR switch is operating in transmit mode (YES at step 702), the methodology proceeds to step 704, where the receiver-side shunt PIN diode is operated as a switchable shunt diode. For example, the receiver-side shunt diode may connected to ground via a first path through a resistor and via a second path via a capacitor, and can be turned on while the TR switch operates in transmit mode to shunt RF and DC signals that may pass through the receiver-side series diode to ground.

Alternatively, if the TR switch is not operating in transmit mode (NO at step 702)—that is, the TR switch is instead operating in receive mode—the methodology proceeds to step 706, where the receiver-side PIN diode operates as a limiter to limit the power of RF signals that are passed to the receiver circuitry. For example, the TR switch circuitry can include a Schottky diode that, when a received RF signal exceeds a first power threshold, becomes forward biased to permit any current that may conducts through the receiver-side shunt diode to flow through a loop comprising the receiver-side shunt diode, the Schottky diode, and an inductor (see FIG. 5). Subsequently, if the power level of the received RF signal exceeds a second power threshold (higher than the first power threshold) sufficient to forward bias the receiver-side shunt diode, the receiver-side shunt diode begins conducting current, forming a limiter circuit with the Schottky diode and the inductor. This causes an impedance mismatch at the input of the limiter circuit that reflects a portion of the RF signal power back toward its source, thereby limiting the amount of RF signal power that is passed to the receiver circuitry. The operating mode of the TR switch is constantly monitored at step 702 so that the function of the receiver-side shunt diode can be changed in accordance with the operating mode.

Reference throughout this specification to "one embodiment," "an embodiment," "an example," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "engine," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A transmit-receive (TR) switch circuit, comprising:
a transmitter-side branch that permits first radio frequency (RF) signals generated by a transmitter to pass to an antenna while the TR switch circuit operates in a transmit mode;
a receiver-side branch that permits second RF signals received at the antenna to pass to a receiver while the TR switch circuit operates in a receive mode;
a receiver-side shunt PIN diode that connects a signal path of the second RF signals to ground via a direct current (DC) blocking capacitor; and
circuitry, comprising at least a Schottky diode, that causes the receiver-side shunt PIN diode to operate as a switchable shunt diode while the TR switch circuit operates in the transmit mode, and that causes the receiver-side shunt PIN diode to operate as a limiter while the TR switch circuit operates in the receive mode.

2. The TR switch circuit of claim 1, wherein
operation of the TR switch circuit in either the transmit mode or the receive mode is controlled in part by a receive control signal generated by a receive control signal generator connected to the signal path of the second RF signal via an RF choke inductor, and the Schottky diode connects a cathode of the receiver-side shunt PIN diode to a node between the RF choke inductor and the receive control signal generator.

3. The TR switch circuit of claim 2, wherein
in response to the second RF signal exceeding a first power threshold while the TR switch circuit operates in the receive mode, the Schottky diode becomes forward biased, and
in response to the second RF signal exceeding a second power threshold greater than the first power threshold while the TR switch circuit operates in the receive mode, the receiver-side shunt PIN diode becomes forward biased.

4. The TR switch circuit of claim 2, wherein the receiver-side shunt PIN diode, the Schottky diode, and the RF choke inductor operate as a limiter circuit while the second RF signal exceeds a power threshold sufficient to forward bias the receiver-side shunt PIN diode and the Schottky diode.

5. The TR switch circuit of claim 2, wherein, while the TR switch circuit operates in the transmit mode, the Schottky diode is reverse biased and the receiver-side shunt PIN diode is forward biased.

6. The TR switch circuit of claim 1, wherein the Schottky diode is connected between a cathode of the receiver-side shunt PIN diode and the signal path of the second RF signals.

7. The TR switch of claim 6, wherein
in response to the second RF signal exceeding a first power threshold while the TR switch circuit operates in the receive mode, the Schottky diode becomes forward biased, and
in response to the second RF signal exceeding a second power threshold greater than the first power threshold while in the receive mode, the receiver-side shunt PIN diode becomes forward biased.

8. The TR switch of claim 6, wherein the receiver-side shunt PIN diode and the Schottky diode operate as a limiter circuit while the second RF signal exceeds a power threshold sufficient to forward bias the receiver-side shunt PIN diode and the Schottky diode.

9. A telecommunications device comprising the TR switch circuit of claim 1.

10. A transmit-receive (TR) switch circuit, comprising:
transmitter-side circuitry that switches an antenna to a transmitter while the TR switch circuit operates in a transmit mode; and
receiver-side circuitry that switches the antenna to a receiver while the TR switch operates in a receive mode,
wherein
the receiver-side circuitry comprises a shunt PIN diode and protective circuitry configured to cause the shunt PIN diode to operate as a switchable shunt diode while the TR switch circuit operates in the transmit mode and to cause the shunt PIN diode to operate as a limiter while the TR switch circuit operates in the receive mode, and
the protective circuitry comprises at least Schottky diode.

11. The TR switch circuit of claim 10, wherein the protective circuitry further comprises:
a radio frequency (RF) choke inductor configured to pass a receive control signal that controls a biasing of the shunt PIN diode based on whether the TR switch circuit is operating in the transmit mode or the receive mode,
wherein the Schottky diode forms a limiter circuit comprising the shunt diode and the RF choke inductor while the Schottky diode is forward biased.

12. The TR switch of claim 11, wherein
in response to a received RF signal exceeding a first power threshold while the TR switch circuit operates in the receive mode, the Schottky diode becomes forward biased, and
in response to the received RF signal exceeding a second power threshold greater than the first power threshold while in the receive mode, the shunt PIN diode becomes forward biased.

13. The TR switch of claim 11, wherein the shunt PIN diode, the Schottky diode, and the RF choke inductor operate as the limiter circuit while the second RF signal exceeds a power threshold sufficient to forward bias the shunt PIN diode and the Schottky diode.

14. The TR switch of claim 11, wherein
while the TR switch circuit operates in the transmit mode, the Schottky diode is reverse biased and the shunt PIN diode is forward biased, and
forward biasing the shunt PIN diode while the Schottky diode is reverse biased causes RF signals received at the receiver-side circuitry to be shunted to ground.

15. The TR switch of claim 10, wherein the Schottky diode is connected between a cathode of the shunt PIN diode and a signal path of an RF signal received at the receiver-side circuitry.

16. The TR switch of claim 15, wherein,
in response to a received RF signal exceeding a first power threshold while the TR switch circuit operates in the receive mode, the Schottky diode becomes forward biased, and
in response to the received RF signal exceeding a second power threshold greater than the first power threshold while in the receive mode, the shunt PIN diode becomes forward biased.

17. The TR switch of claim 15, wherein the shunt PIN diode and the Schottky diode operate as a limiter circuit while the received RF signal exceeds a power threshold sufficient to forward bias the shunt PIN diode and the Schottky diode.

18. A telecommunications device comprising the TR switch circuit of claim 10.

19. A method for protecting a receiver from high powered signals, comprising:
in response to determining that a transmit-receive (TR) switch is operating in a transmit mode, causing a shunt PIN diode that is part of receiver-side protective circuitry to operate as a switchable shunt diode; and
in response to determining that the TR switch is operating in a receive mode, causing the shunt PIN diode to operate as a limiter,
wherein the causing of the shunt PIN diode to operate as the switchable shunt diode or as the limiter is controlled by a Schottky diode that is part of the receiver-side protective circuitry.

20. The method of claim 19, wherein the causing of the shunt PIN diode to operate as the limiter comprises:
in response to detecting that a radio frequency (RF) signal received during the receive mode exceeds a first power threshold, forward biasing the Schottky diode, and
in response to detecting that the RF signal exceeds a second power threshold greater than the first power threshold, forward biasing the shunt PIN diode,
wherein the shunt PIN diode, the Schottky diode, and an RF choke inductor form a limiter circuit while the Schottky diode is forward biased.

* * * * *